INVENTORS
HARRY G. ANASTASIA
WILLIAM T. CLERMONT

Oct. 1, 1957   H. G. ANASTASIA ET AL   2,807,958
MEANS FOR INDICATING EQUIVALENT AIRSPEED
Filed May 17, 1954   2 Sheets-Sheet 2

*INVENTORS*
*HARRY G. ANASTASIA*
*WILLIAM T. CLERMONT*
BY *Herbert Smith*
   *ATTORNEY*

United States Patent Office 2,807,958
Patented Oct. 1, 1957

2,807,958

MEANS FOR INDICATING EQUIVALENT AIRSPEED

Harry G. Anastasia, Paramus, and William T. Clermont, Hackensack, N. J., assignors to Bendix Aviation Corporation, Teterboro, N. J., a corporation of Delaware Application May 17, 1954, Serial No. 430,365

8 Claims. (Cl. 73—178)

This invention relates to means of providing an indication of airspeed, and more particularly to means for indicating airspeed of high performance aircraft, wherein equivalent airspeed ($V_e$) is used as a new parameter as the factor in determining the safe speed limit in the operating range of an aircraft.

It is an object of the present invention to provide means for indicating safe speed limits for operating aircraft.

It is another object of the present invention to provide means for presenting the equivalent airspeed function as a factor in determining the safe operating speed range of an aircraft.

A further object is to provide a novel indicating means for aircraft wherein equivalent airspeed function is utilized as the determining factor in indicating the maximum speed limit in the operating range.

A further object is to provide a means of indicating the allowable safe speed of an aircraft wherein equivalent airspeed is used as the limiting function.

A further object is to provide a novel airspeed indicator wherein the permissive speed performance of a craft is increased by employing equivalent airspeed as the determining factor in limiting the maximum operating speed range.

A further object is to provide an aircraft speed indicator which indicates the particular airspeed equal to a predetermined equivalent airspeed.

A further object is the provision of a speed indicator which may be preset to indicate the rated safe airspeed of a craft, which airspeed is equal to a predetermined equivalent airspeed, and which is automatically variable in accordance with aerodynamic changes.

A further object is the provision of a speed indicator which may be preset to indicate the rated safe airspeed of a craft, which airspeed is equal to a predetermined equivalent airspeed, and which maintains this same equivalent airspeed at varying altitudes.

The novel device contemplated in the present invention is an airspeed indicator which includes altitude and airspeed mechanisms incorporated in a single housing. One mechanism has an angularly displaceable index movable clockwise with increasing altitudes and indicates the particular indicated airspeed which is equal to a predetermined or preset equivalent airspeed. The other mechanism has an angularly displaceable pointer also movable clockwise to show indicated airspeed. Suitable gear and linkage coupling means are used between the index and its aneroid, and the pointer and its aneroid, so that the relative positions of said index and pointer may be observed for controlling an aircraft within safe limits of its operating range, said index motion using equivalent airspeed as a function.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description, and are not to be construed as defining the limits of the invention.

Figure 1:
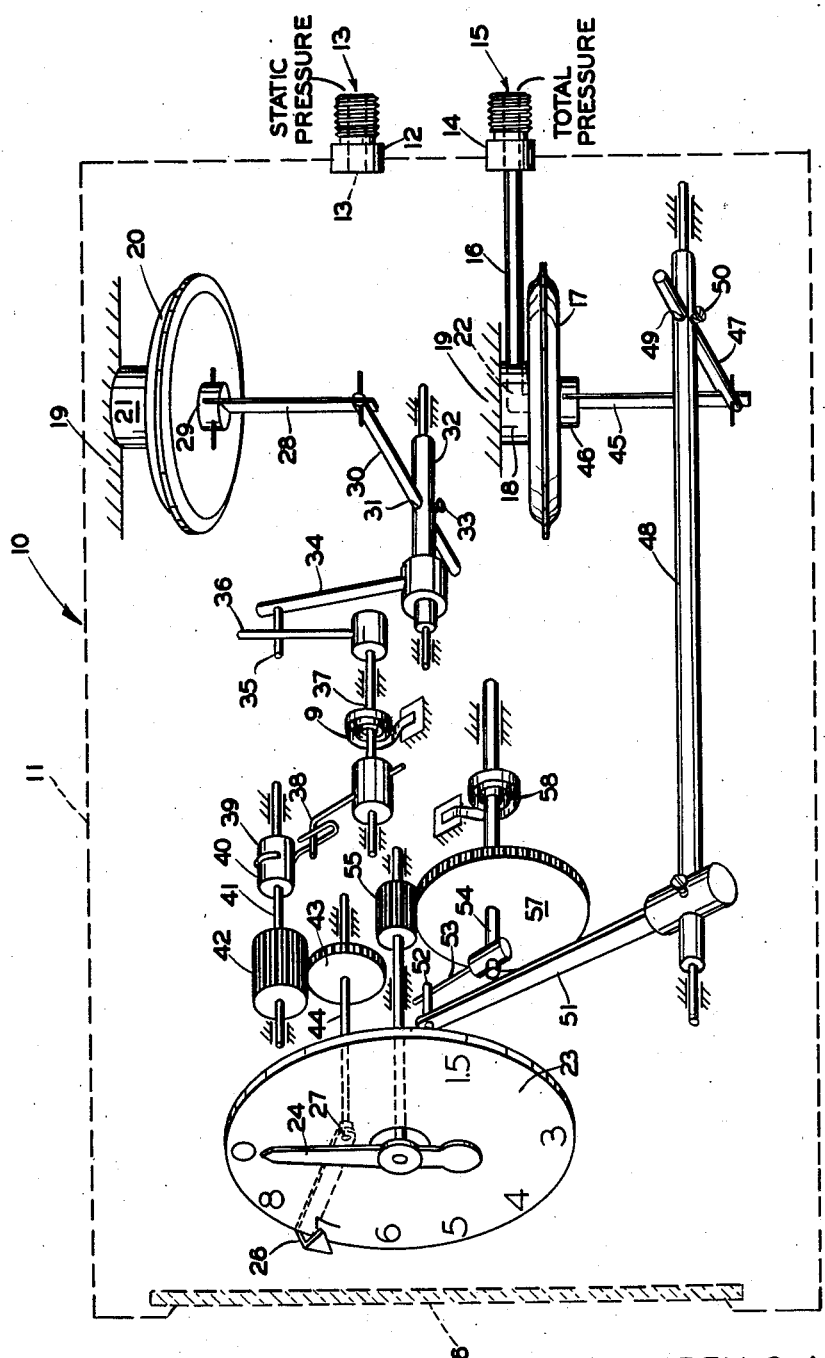
Figure 1 is a schematic diagram of one form of the invention.

Heretofore, Mach number has been selected in general as the determining factor in limiting the operating range of an aircraft. However, equivalent airspeed is used by structural engineers, since all load specifications have long been based on this quantity. In line with this thought, the present invention provides an instrument which utilizes this quantity as the determining factor in limiting the operating range of an aircraft.

The present invention contemplates a device to provide means of presenting this equivalent airspeed function as the limiting factor in the permissive operating range.

Below there are two tables showing the variation of maximum allowable airspeeds with altitude assuming constant Mach number and constant equivalent airspeed.

The purpose in presenting the following tables is to show that when using Mach number as the limiting factor of safe flight, indicated airspeed decreases appreciably with increasing altitude. However, when using equivalent airspeed as the limiting factor of safe flight, indicated airspeed increases with increasing altitudes.

TABLE I

*At constant Mach number*

| Altitude, feet | Ambient air temp., °K. | Equivalent airspeed, knots | Mach. No. | Indicated airspeed, knots | True airspeed, knots |
|---|---|---|---|---|---|
| 0 | 288 | 700 | 1.059 | 700 | 700 |
| 20,000 | 248.4 | 474 | 1.059 | 506 | 647 |
| 40,000 | 218 | 301 | 1.059 | 334 | 605 |
| 60,000 | 218 | 187 | 1.059 | 211 | 605 |

TABLE II

*At constant equivalent airspeed*

| Altitude, feet | Ambient air temp., °K. | Equivalent airspeed, knots | Mach. No. | Indicated airspeed, knots | True airspeed, knots |
|---|---|---|---|---|---|
| 0 | 288 | 700 | 1.059 | 700 | 700 |
| 20,000 | 248.4 | 700 | 1.563 | 749 | 957 |
| 40,000 | 218 | 700 | 2.462 | 780 | 1,410 |
| 60,000 | 218 | 700 | 3.969 | 793 | 2,270 |

Table I and Table II were computed from equations presented in Report 837 of the National Advisory Committee for Aeronautics. The two equations used for computations are as follows:

(1) $$M = \left\{ 5\left[ \left(\frac{q_c}{p}+1\right)^{2/7} - 1 \right] \right\}^{1/2}$$

where $M$ = Mach number
$q_c$ = impact pressure (total pressure minus static pressure)
$p$ = static pressure The above equation 1 was used in determining indicated airspeeds as tabulated in Table I.

(2) $$V_e = 760.9 M \sqrt{\frac{p}{p_0}}$$

where $Ve$ = equivalent airspeed in miles per hour
$p$ = static pressure
$p_0$ = static pressure under standard conditions
$M$ = Mach number Equation 2 is used for computing Mach number. Using the above Equation 1, we can again compute indicated airspeeds as tabulated in Table II.

In the tables, for a comparative operating range, 700 knots was selected as the basic equivalent airspeed at sea level. In Table I, while maintaining constant Mach number of 1.059, which is equal to an equivalent airspeed of 700 knots at sea level, the altitudes were increased in equal steps from sea level to 60,000 feet. It was then possible to compute the indicated airspeeds for the corresponding altitudes at the above constant Mach number.

In Table II, the equivalent airspeed was held constant at the selected basic speed of 700 knots, and the altitudes were again increased in equal steps as was done in Table I, from sea level to 60,000 feet. The indicated airspeeds were then computed for the corresponding altitudes at the above constant equivalent airspeed.

According to Table I, the indicated airspeed decreased with increasing altitudes, whereas, in Table II, the indicated airspeed increased with increasing altitudes. It was further noted that this trend also occurs for true airspeed, but to a greater degree.

The calculations prove that the indicated permissive airspeed range is appreciably extended by using equivalent airspeed as the limiting function, in contradistinction to Mach number.

The above calculations dictate the end result that must be obtained through a mechanical device to provide an indicator for equivalent airspeed.

It is the practice in the art to show increasing indicated airspeeds in a clockwise motion of the indicator pointer. The maximum allowable index when using Mach number as a function, therefore, will be angularly displaced counterclockwise with increasing altitudes, while the maximum allowable index when using equivalent airspeed as a function, will be displaced clockwise with increasing altitudes.

Immediately, it becomes apparent that when using Mach number as the basis in determining the safe limits in the operating range of an aircraft, as the aircraft increases altitude from sea level, the Mach number index will move toward the indicated airspeed pointer. However, under the same conditions, but when using equivalent airspeed as the basis in determining the safe limits in the operating range of an aircraft, the equivalent airspeed index will move away from the indicated airspeed pointer.

The position of the range limiting index, whether the index is designed to work with a function of Mach number or equivalent airspeed, is the limiting factor relative to the position of the indicated airspeed pointer in indicating the safe maximum operating limit of the aircraft. As the aircraft increases altitude, when using a Mach number function, the relative motion of the index and the pointer will be toward each other, but under similar conditions, when using equivalent airspeed function, the relative motion of the index and the pointer will be away from each other. It is clear that under the two conditions, in the first instance using Mach number function, the indicated airspeed pointer will reach the range limiting index sooner than it would in the second instance using the equivalent airspeed function. Under these conditions, it is obvious that when using equivalent airspeed function as the determining factor in limiting the operating range of an aircraft, in lieu of Mach number function, the permissive speed of an aircraft is increased, and, accordingly, its safe speed performance is extended.

Referring to the drawings, there is shown an equivalent airspeed indicator 10 having a housing 11 and a bushing 12 with an inlet port 13, and a second bushing 14 having an inlet port 15, said bushings being connectable to a Pitot-static head. The bushing 12 is connectable exteriorly, by means of a tube, to the static pressure portion of the Pitot-static head so that the interior of the housing 11 will be under influence of the static pressure from the Pitot-static head. The bushing 14 has one end thereof connectable exteriorly to the total pressure portion of the Pitot-static head, while the opposite end of the bushing is connectable within the housing, via a tube 16, to a fluid pressure responsive element or aneroid 17 via a hub 18. The hub 18 is mounted to a supporting structure 19 disposed within the housing, and has a communicating passage 22 therein to permit pressure from the Pitot-static head to influence the fluid pressure responsive element or aneroid 17.

A second fluid pressure responsive element 20 has a hub 21 which is also securely mounted to the supporting structure 19. The fluid pressure responsive devices 17 and 20 may assume any form of pressure responsive diaphragm or bellows, such as the evacuated diaphragm of the aneroid portion of an aneroid barometer. The fluid pressure responsive element 20 is evacuated. One side of the aneroid 20 is rigidly connected to the supporting structure 19, and the opposite side of the fluid pressure responsive element will move in accordance with the static pressure within the housing 11.

Since one side of the fluid pressure responsive element or aneroid 17 is rigidly connected to the supporting structure 19, the opposite side thereof is free to move in response to the total pressure.

A dial 23 is stationarily mounted in housing 11 and has calibrations thereon with numerals indicative of indicated airspeed, each numeral representing 100 knots. A pointer 24 is pivotally mounted through the dial center at point 25 on the pointer shaft 56. The pointer 24 is actuated by a gear and linkage coupling to the movable side of the fluid pressure responsive element or aneroid 17. An index 26 is pivotally mounted at point 27 on the dial 23, said index being responsive to the movable portion of the fluid pressure responsive element 20 through gear and linkage coupling. In this view, the index is eccentrically mounted relative to the dial 23 and the pointer shaft 56.

The device of the invention has two entirely independent mechanisms, namely an equivalent airspeed mechanism for operating the index 26 under influence of the fluid pressure responsive element 20, and an indicated airspeed mechanism for operating the pointer 24 under influence of the fluid pressure responsive element 17.

Pertaining to the equivalent airspeed mechanism, an aneroid arm 28 is pivotally connected to a hub 29 secured to the movable portion of the fluid pressure responsive element or aneroid 20. The opposite end of said aneroid arm 28 is pivotally connected to a link 30, which link is slidable through a hole 31 in the rocking shaft 32 and is adjustably positionable therein and held in a desired position by a screw 33 which is threadedly connected with said rocking shaft.

The rocking shaft is mounted for rotatable movement and has one end of a shaft arm 34 secured normal thereto. The opposite end of the shaft arm has a pin 35 extending laterally therefrom and is positioned to engage a rod 36, said rod being positioned normal to said pin 35. One end of the rod 36 is secured at right angles to a shaft 37, said shaft being mounted for rotatable movement and having a take-up spring 9 to take up the play in the gear and linkage coupling. The shaft 37 has one end of an L link 38 secured thereto with the opposite end of the L link being bent to be substantially parallel with the axis of the shaft 37. A loop link 39 is secured to a hub 40 connected to a shaft 41 so that the loop link and the L link will be in movable engagement with each other. Pinion 42 is secured on the shaft 41, and is in engagement with gear 43 mounted on the index shaft 44 which is connected to the index 26 and mounted for rotatable movement in relation to the dial 23.

The L link and the loop link 38 and 39, respectively, form a corrector linkage, and the shafts 34 and 37, with the pins 35 and 36 form a variable ratio linkage.

Pertaining to the indicated airspeed mechanism, the pointer 24 is actuated in response to the fluid pressure responsive element or aneroid 17. The movable portion of the element 17 has an aneroid arm 45 at one end thereof pivotally mounted to a hub 46 which is secured to the movable portion of its associated fluid pressure responsive element or aneroid 17. The opposite end of said aneroid arm is pivotally connected to a link 47 which in turn is connected to the rocking shaft 48 through a hole 49 therein, said link being adjustably secured in relation to the rocking shaft by means of a screw 50. The rocking shaft 48 is mounted for rotatable movement. Shaft arm 51 has one end thereof connected to and normal with the rocking shaft 48, with the other end thereof carrying a pin 52 disposed normal therewith. A rod 53 has one end thereof secured, at a right angle, to the gear shaft 54, with the opposite end of said rod extending from said gear shaft to be in movable engagement with pin 52. A pinion 55 carried on the pointer shaft 56 is in mesh with gear 57 carried on the gear shaft 54. The pointer 24 is secured to the pointer shaft 56 for movement in accordance with rotation of said shaft.

A take-up spring 58 is connected at one end thereof to the shaft 54 with the opposite end thereof connected to the supporting structure to take up the play in the gear and linkage arrangement. A corrector linkage includes shaft 51, pin 52 and rod 53.

In Fig. 1 the index shaft 44 is shown eccentrically mounted in relation to the dial 23, while the pointer 24 is shown concentrically mounted with the dial 23.

Figure 2:
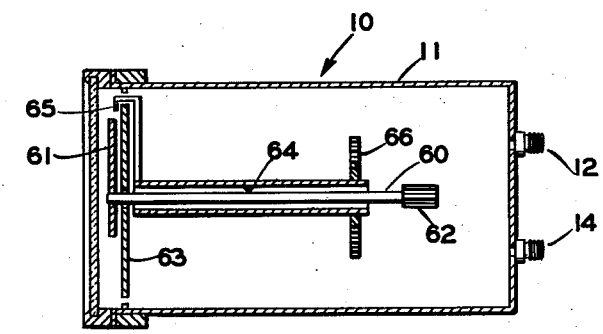
Figure 2 is an encased representative form of a modified portion of the invention.

In Fig. 2, there is shown a modification of the arrangement of the index shaft relative to the pointer, wherein the pointer shaft 60 has a pointer 61 secured to one end thereof and a pinion 62 secured adjacent to the other end thereof, with the pointer shaft being concentrically mounted in relation to the dial 63. A hollow index shaft 64 is concentrically mounted in relation to the dial 63 and disposed exteriorly of the shaft 60 and is free to move relative thereto. An index 65 is secured to one end of the hollow index shaft 64, and a gear 66 is secured adjacent to the opposite end of said hollow index shaft. The gear 66 is coupled to the fluid pressure responsive element or aneroid 20 and is actuated in accordance with the static pressure within the housing 11 in the manner heretofore explained. The pinion 72 is coupled to the fluid pressure responsive element or aneroid 17 and is responsive to the total pressure through the tube 16 as heretofore explained.

Figure 3:
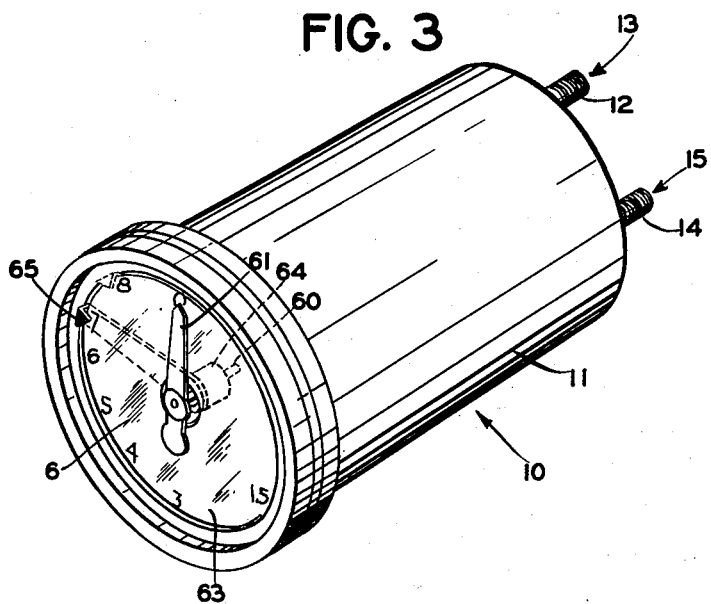
Figure 3 is a view of the encased instrument showing an index and pointer relative to a scale.

Fig. 3 shows the equivalent airspeed indicator 10 having the hermetically sealed housing 11 and transparent window 6, with the bushings 12 and 14 in the housing being connectable to the respective pressure portions of the Pitot-static head. The pointer 61 and index 65 are shown concentrically mounted to conform with the presentation shown in Fig. 2.

In Fig. 3, the index 65 is shown positioned relative to the scale at the numeral 7, representing 700 knots at sea level. This index is factory set at the desired scale reading for the particular type aircraft on which the instrument is to be used. With the setting of the index as shown at 700 knots at sea level, the index would move clockwise with increased altitude. At the altitude of 60,000 feet, the index would be in the position shown dotted which would show the indicated airspeed of 793 knots which is equal to an equivalent airspeed of 700 knots at sea level. The pilot could vary the indicated airspeed of his aircraft up to the equivalent airspeed index of 793 knots without operating beyond the critical equivalent airspeed of 700 knots for the particular aircraft at the indicated altitude. The various types of craft would have different ratings of critical equivalent airspeed, and the index of their respective equivalent airspeed indicators would be preset accordingly.

Normally, an adjustable spring device is used relative to the movable portion of the respective aneroids for restraining the action thereof. While no such spring devices are shown in the drawings, they are well-known in the art, and suitable means may be used as desired.

The gear and linkage arrangements of the equivalent airspeed mechanism is designed and arranged to incorporate all necessary mechanical means to cause the instrument to be operative in accordance with the functions as embraced in equations for aerodynamics. The indicated airspeed mechanism may take any conventional form.

The equivalent airspeed mechanism is entirely independent in its operation from the indicated airspeed mechanism, although one graduated dial is used for relative indications in conjunction with the index and the pointer. While the equivalent airspeed mechanism is shown in a housing with an indicated airspeed mechanism, it is to be understood that the equivalent airspeed mechanism may have a separate housing, or may be used in conjunction with a Machmeter, a Mach airspeed indicator or other airspeed indicating mechanisms in a unitary housing and any required number of dials and pointers or index means may be employed accordingly.

The device of the invention may be used not only with a Pitot-static head, or a convenient Pitot system, but it may be used with any device or system that adequately provides the pressure requisites for proper operation of the device to show equivalent airspeed and indicated airspeed, equivalent airspeed only, or other desired arrangements in combination with equivalent airspeed.

The adjustable bar 28 and the rocking shaft 32 comprise an adjustable linking means in the computing mechanism so that the adjustable linkage may be preset to control the effectiveness thereof to correlate same with the desired or critical equivalent airspeed of a type craft at a predetermined elevation, such as sea level.

The pressure sensitive element or aneroid responsive to static pressure may be any device that is responsive to ambient pressure for adequately actuating the movable member or index of the equivalent airspeed indicator.

The reference means may take any suitable form as well as the pointer and index shown, and a graduated dial or other reference member may be rotated or moved accordingly.

The equivalent airspeed portion of the device may be combined in many forms with other apparatus wherein pressures are sensed and compared in various methods.

As many changes could be made in the above construction and many apparently widely different embodiments of this invention could be made without departing from the scope thereof, it is intended that all matters contained in the above description or shown in the accompanying drawings shall be interpreted as illustration and not in a limiting sense.

What is claimed is:

1. Safe airspeed indicating apparatus for aircraft comprising a reference element carrying an airspeed scale, a maximum safe airspeed indicator movable along the scale and positioned to indicate thereon the maximum safe airspeed at a datum altitude, and means for moving the indicator along the scale in accordance with changes in equivalent airspeed, the airspeed scale being calibrated to indicate a type of airspeed other than equivalent airspeed.

2. Safe airspeed indicating apparatus for aircraft comprising a reference element carrying an indicated airspeed scale, a maximum safe indicated airspeed indicator movable along the scale and positioned to indicate thereon the maximum safe indicated airspeed at a datum altitude, and means for moving the indicator along the scale in accordance with changes in equivalent airspeed.

3. Safe airspeed indicating apparatus for registering a selected type of airspeed, including a reference element carrying a scale calibrated in said type of airspeed, a first indicator, and means for moving the indicator along the scale in conformity with variations in said type of airspeed of the aircraft; and means for registering maximum safe airspeed in terms of said type of airspeed, including a second indicator positioned to indicate the maximum safe airspeed at a datum altitude, and means for moving the second indicator along the scale in accordance with changes in equivalent airspeed, arranged to indicate travel at the maximum safe airspeed regardless of altitude by coincidence of the two indicators, said selected type of airspeed being different from equivalent airspeed.

4. Safe airspeed indicating apparatus for aircraft comprising means for registering indicated airspeed, including a reference element carrying an indicated airspeed scale, a first indicator movable along said scale, and means for moving the indicator in conformity with variations in the indicated airspeed of the aircraft; and means for registering maximum safe airspeed in terms of indicated airspeed, including a second indicator positioned to indicate the maximum safe airspeed at a datum altitude, and means for moving the second indicator along the scale in accordance with changes in equivalent airspeed, arranged to indicate travel at the maximum safe indicated airspeed regardless of altitude by coincidence of the two indicators.

5. A device for indicating the indicated airspeed which corresponds to the critical safe airspeed for varying altitudes, comprising reference means graduated in indicated airspeed, a movable member movable relative to said reference means, and means comprising an aneroid responsive to ambient pressure and a computer including variable drive means coupling said movable member with said aneroid for moving said member along the scale in accordance with changes in equivalent airspeed due to changes in altitude from a datum altitude.

6. A device of the kind set forth in claim 5, and wherein indicated airspeed apparatus having a movable member is disposed relative to the equivalent airspeed responsive member for visual comparison therewith.

7. A device for displacing a movable member whose initial and subsequent position represents a predetermined critical equivalent airspeed comprising a reference element carrying an airspeed scale graduated in indicated airspeed, a movable member movable in relation to said reference element, and means for moving said member along said reference means in accordance with changes in equivalent airspeed due to changes in altitude comprising an aneroid responsive to ambient pressure, and a computing mechanism including a gear and linkage arrangement coupling said movable member with said aneroid and converting motion of said aneroid to movement of said movable member in response to pressure changes from a reference pressure representing a datum altitude.

8. A device of the kind set forth in claim 6 and wherein an indicated airspeed apparatus is carried by a supporting structure in common with the equivalent airspeed indicator, said device and said indicated airspeed apparatus each having a movable reference element movable relative to a single dial for comparison.

References Cited in the file of this patent

UNITED STATES PATENTS

| 2,424,511 | Stanley | July 22, 1947 |
| 2,522,337 | Angst | Sept. 12, 1950 |
| 2,682,768 | White | July 6, 1954 |

FOREIGN PATENTS

| 664,890 | England | Oct. 13, 1949 |

OTHER REFERENCES

Sonic Speed Warnings "Flight," June 19, 1947, pp. 579, 580 and 585.